United States Patent [19]
Fanuele et al.

[11] Patent Number: 6,086,298
[45] Date of Patent: Jul. 11, 2000

[54] CLAMPING DEVICE FOR SECURING RECREATIONAL VEHICLE OR APPLIANCE

[76] Inventors: Frank J. Fanuele, 256 Partridge St., Albany, N.Y. 12208-2624; Mark F. Fanuele, 36 Sanford Pl., Altamont, N.Y. 12009-9252

[21] Appl. No.: 08/976,932

[22] Filed: Nov. 24, 1997

[51] Int. Cl.$^7$ .................................................... B60P 7/08
[52] U.S. Cl. ........................................ 410/3; 410/2; 410/7
[58] Field of Search .................... 410/2, 3, 4, 7, 410/9, 19, 77; 248/500, 503

[56] References Cited

U.S. PATENT DOCUMENTS

| | | |
|---|---|---|
| 3,726,423 | 4/1973 | Miron . |
| 4,900,215 | 2/1990 | Nowell . |
| 5,044,845 | 9/1991 | Baker, Jr. ...................................... 410/3 |
| 5,203,655 | 4/1993 | Persau ......................................... 410/3 |
| 5,540,538 | 7/1996 | Head, Sr. . |
| 5,542,815 | 8/1996 | Roeling . |
| 5,607,270 | 3/1997 | Zimmerman ................................. 410/3 |
| 5,716,175 | 2/1998 | Fenske et al. .............................. 410/3 |
| 5,785,471 | 7/1998 | Godbersen .................................. 410/3 |
| 5,816,757 | 10/1998 | Huston ........................................ 410/3 |
| 5,902,081 | 5/1999 | Zizzi .......................................... 410/3 |

*Primary Examiner*—Stephen T. Gordon
*Attorney, Agent, or Firm*—Heslin & Rothenberg, P.C.

[57] ABSTRACT

A clamping system and device for securing a recreational vehicle or appliance to a support surface. The device comprises a base plate mountable on the support surface. An end effector is coupled to the base plate, the end effector being actuatable between a clamped and unclamped position. A transfer mechanism is coupled to the end effector in operative relation to the base plate wherein the transfer mechanism actuates the end effector between the clamped and unclamped position for securing the recreational vehicle or appliance to the support surface.

14 Claims, 4 Drawing Sheets

CLAMPING DEVICE FOR SECURING RECREATIONAL VEHICLE OR APPLIANCE

FIELD OF THE INVENTION

This invention relates generally to a clamping device. More particularly, our invention comprises a clamping device or system for securing a recreational vehicle, such as a snowmobile, or an appliance to a trailer.

BACKGROUND OF THE INVENTION

All different types of recreational vehicles exist, such as snowmobiles, motorcycles, all terrain vehicles, jet skis, etc. Additionally various appliances exist such as lawn and garden equipment and other trailer transported mechanical equipment. Of these appliances and vehicles there are all different sizes and configurations. Using such a vehicle or appliance often requires transporting to a particular place, e.g., a lake, an off road track, etc. The most common mode of transportation is a flat surface such as a trailer hitched behind an automobile or the like. Accordingly, there is a need for securing the recreational vehicle or appliance to the trailer when it is in transit on the trailer.

Various devices exist for securing a recreational vehicle or appliance to a trailer or similar support surface. However, these devices all have serious drawbacks. For example, prior devices are not adjustable to accommodate different type, size and configured recreational vehicles, appliances or trailers. Prior devices do not include dual locking features with anti-theft ability. Prior devices do not enable easy positioning, repositioning, and operation of the device itself relative to the recreational vehicle, appliance or trailer. Prior devices have narrow operating tolerances that make them difficult to use and inoperable under ordinary conditions such as snow or ice buildup during towing of the trailer. Our invention is not hindered by the shortcomings of the prior devices.

These and other types of recreational vehicle or appliance securing devices disclosed in the prior art do not offer the flexibility and inventive features of our Clamping Device For Securing a Recreational Vehicle. As will be described in greater detail hereinafter, the features of the present invention differ from those previously proposed.

SUMMARY OF THE INVENTION

According to our present invention we have provided a clamping system for securing a recreational vehicle or appliance to a support surface. The system generally comprises a bar, a clamping device and a connecting mechanism coupling the clamping device to the support surface. The bar is adapted to engage the recreational vehicle or appliance. In operation, the clamping device operatively engages the bar, or vehicle or appliance directly, to secure the same to the support surface. The clamping device comprises a base plate mountable on the support surface, an end effector attached to the base plate and actuatable between a clamped and an unclamped position to clamp and unclamp the bar, a lever operatively connected to the end effector and a transfer linkage operatively connected to the lever wherein the lever and the transfer linkage cooperate to actuate the end effector to clamp and unclamp the bar. The connecting mechanism is coupled to the base plate wherein the clamping device is removably connectable to the support surface.

Another feature of our invention relates to locking the end effector in the clamped position wherein locking comprises a transfer mechanism including a lever and transfer linkage operatively coupled to the lever and the transfer linkage and the lever coupled in an angular relationship relative to one another.

Still another feature of our invention concerns the locking further comprising the transfer linkage including a transfer member and a transfer channel, the transfer member joined to the lever and engageable with the transfer channel and wherein the angular relationship between the lever and the transfer linkage comprises an obtuse angle defined between the transfer member and the lever.

According to yet another feature of our invention we have also provided locking the end effector in the clamped position wherein locking comprises a locking member engageable with a locking bracket, the locking bracket being secured to the base plate and wherein engaging the locking member and the locking bracket restricts manipulation of the end effector.

Yet other features of our invention we have provided are a transfer mechanism and end effector which rotate with each other in the same upward and downward directions, incrementally adjusting the clamped position of the end effector and a tensioner joined between the base and the end effector to assist manipulating or actuating the end effector.

In accordance with the following, it is an advantage of the present invention to provide a clamping device which is adjustable to accommodate different type, size and configured recreational vehicles, appliances and trailers.

A further advantage is to provide a clamping device that enables easy positioning, repositioning, and operation of the device itself relative to the recreational vehicle or appliance and the trailer.

Yet a further advantage is to provide locking features wherein the clamping device can be self locking for securing a recreational vehicle or appliance and can be engageable with an independent locking mechanism for theft prevention of the same.

Another advantage is to provide a clamping device having wide operating tolerances that make it safe, easy and reliable to use under ordinary circumstances, such as snow or ice buildup during towing of the trailer, and in extraordinary conditions, such as severe weather.

Still another advantage is to provide a clamping system that can be retrofit to exist trailers, using or replacing the alterations made to a trailer for prior recreational vehicle or appliance securing devices.

DESCRIPTION OF THE DRAWINGS

Other features and advantages of our invention will become more readily apparent upon reference to the following description when taken in conjunction with the accompanying drawings, which drawings illustrate several embodiments of our invention.

DETAILED DESCRIPTION OF PREFERRED EMBODIMENT

Figure 1:
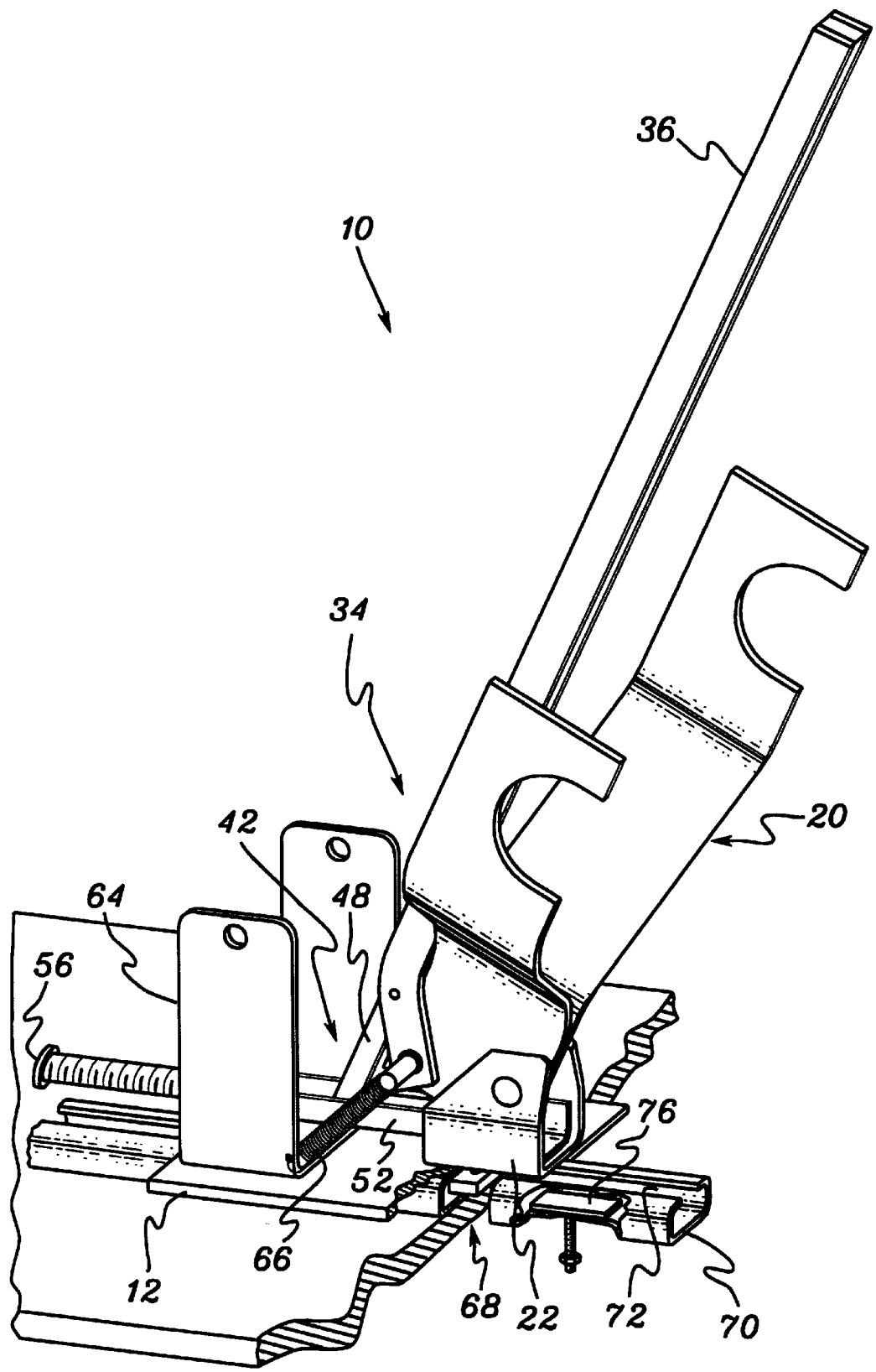
FIG. 1 is a perspective view of our clamping device for securing a recreational vehicle to a surface in accordance with the features of our invention.

Referring now to the drawings, a clamping system 8 includes a clamping device 10 connectable to a support surface 18. The system can be used to secure a recreational vehicle, such as a snowmobile 14, to the support surface of a trailer or other flat-type surface to which the clamping device can be connected. Shown here specifically for a snowmobile, the system includes a force transmitting member 58, which is preferably a tubular, resilient metal bar.

The bar 58 is of sufficient length to engage a portion of the recreational vehicle. Further, it is desirable that the bar be constructed to have a characteristic whereby the clamping force of the clamping device deflects the bar downward to secure the vehicle but the bar springs back to its original substantially straight shape when the clamping force is released, and the bar is not bent. Excellent results are also contemplated when the bar includes cushions 60, preferably constructed of rubber, to prevent damage to painted surfaces of the recreational vehicle.

In one embodiment, the portion of the vehicle 14 preferably comprises skis 16 of the snowmobile. However, it should be understood that another portion of the vehicle or other vehicles such as motorcycles, all terrain vehicles, jet skis, etc. or an appliance such as lawn and garden equipment and other trailer transported mechanical equipment, could be engaged as long as it enables secure fastening of that portion and the related entire vehicle or appliance. Also, for some recreational vehicles and appliances the clamping device may directly engage the portion of the vehicle or appliance for securing the same. Yet further, the clamping system with the bar 58 could be used to secure one or more motorcycles to a trailer. The bar would engage over the front or rear wheel rims of the cycles, aligned one next to the another. Then, clamping the bar downwardly would sandwich the wheels between the bar and the support surface for securing the vehicle(s).

The clamping device 10 preferably includes a base plate 12. An end effector 20 is coupled to the base plate. The end effector is actuatable between a clamped position 26 and an unclamped position 28. A transfer mechanism 34 is coupled to the end effector 20 in operative relation to the base plate 12. The transfer mechanism actuates the end effector 20 between the clamped and unclamped position for engaging the force transmitting member 58, or vehicle or appliance directly, and securing the same to the support surface.

A near end 33 of the effector is pivotally joined or coupled to a front bracket 22 at a first pivot point 24 by a first pin 25. The first pivot point is preferably located in spaced relation from the support surface 18. The front bracket is preferably fixed relative to the base plate by any appropriate means. In a preferred embodiment of the invention the end effector comprises a Y-shaped member bifurcated at a distant end 32. The bifurcated end assists in stabilizing the bar 58 during clamping. It should be understood however that the distant end of the effector 20 could be unitary and still fall within the scope of the present invention.

The transfer mechanism preferably comprises a lever 36 and transfer linkage 42 operatively coupled to the lever. The lever can be pivotally joined to the end effector 20 at a second pivot point 40 by a second pin 41. The second pivot point is preferably spaced from the first pivot point 24, similar to that shown. The transfer linkage can be joined to the lever 36 at a third pivot point 50 by a third pin 51. The third pivot point is preferably spaced from the second pivot point 40, similarly as shown. With the end effector, lever and transfer linkage operatively connected or joined or coupled, in operation the lever and the transfer linkage cooperate to actuate or manipulate the end effector into the clamped and unclamped positions respectively.

The transfer linkage preferably includes a transfer member 48 and a transfer channel 52. The transfer channel is preferably fixed relative to the base plate by any appropriate means. The transfer channel is adapted to receive the transfer member for engagement therewith. The transfer member preferably slidably engages the transfer channel, though it may be fixedly positioned. With a slidably engaged transfer member, the transfer channel may include an adjustment member 56 where an end of the transfer member engages or butts up against the adjustment member. In this way, the adjustment member, such as a screw, can be adjusted to shorten the length of the transfer channel thereby pushing the transfer member forward towards the end effector for incrementally adjusting the positioning of the end effector in the clamped and unclamped positions. The further forward the adjustment member is positioned towards the end effector the more the range of motion the end effector travel is pushed forward and the closer the end effector will be to the support surface when in the clamped position.

Figure 2:
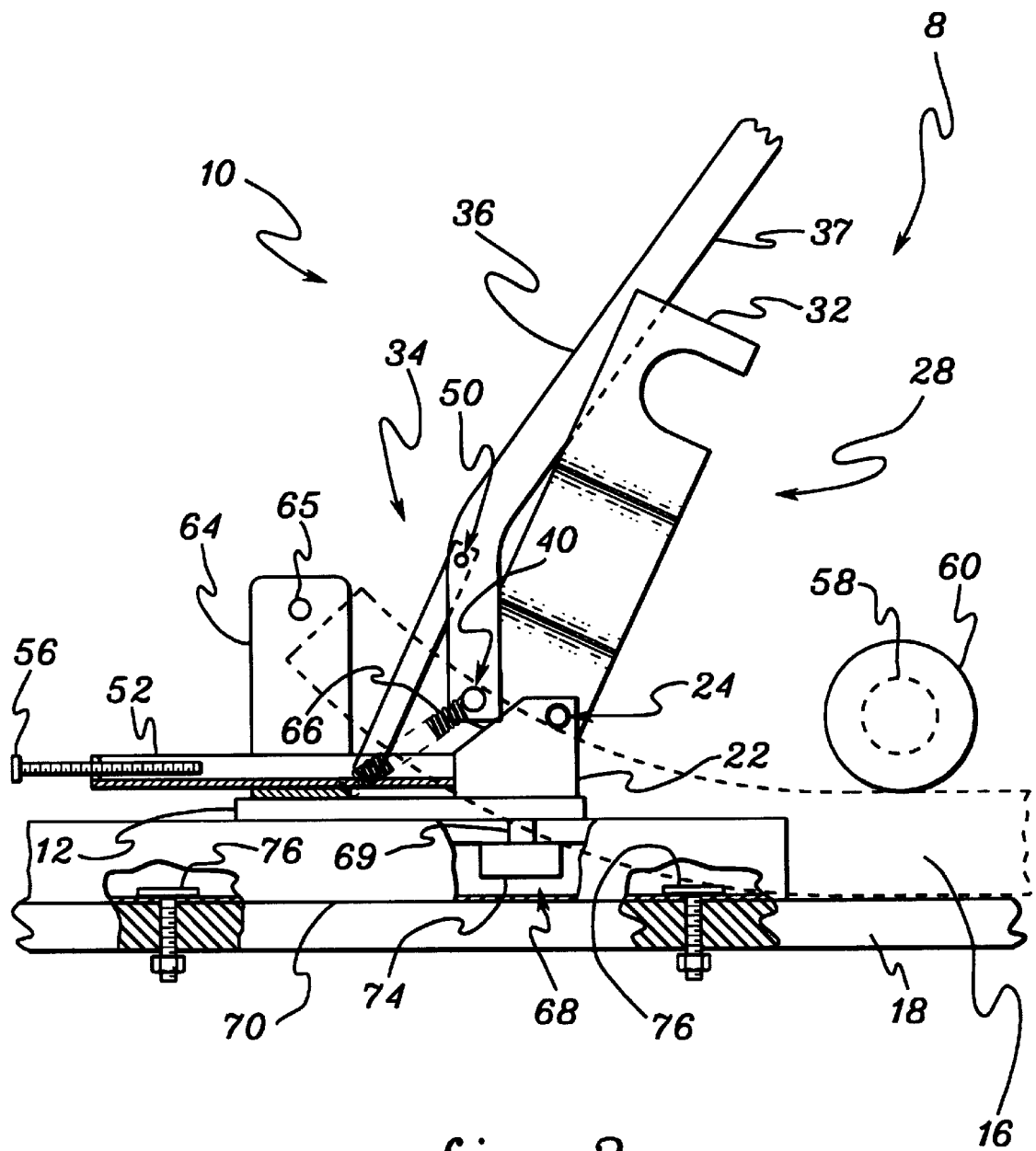
FIG. 2 is a partial cut-away side view of our clamping system comprising a reduced size view of our clamping device shown in FIG. 1, with a ski in phantom as positioned on a trailer surface.
Figure 3:
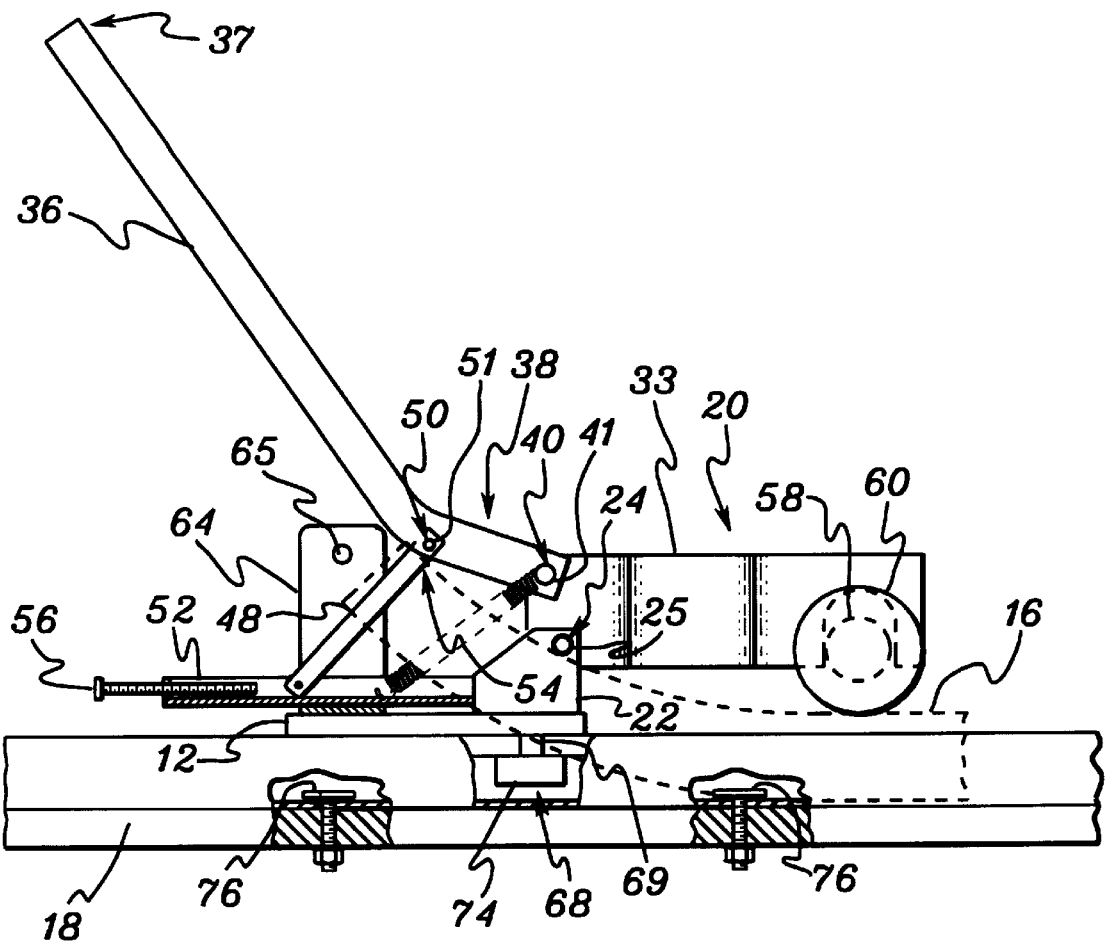
FIG. 3 is a view of the system shown in FIG. 2, with the end effector being moved towards a clamped position.
Figure 4:
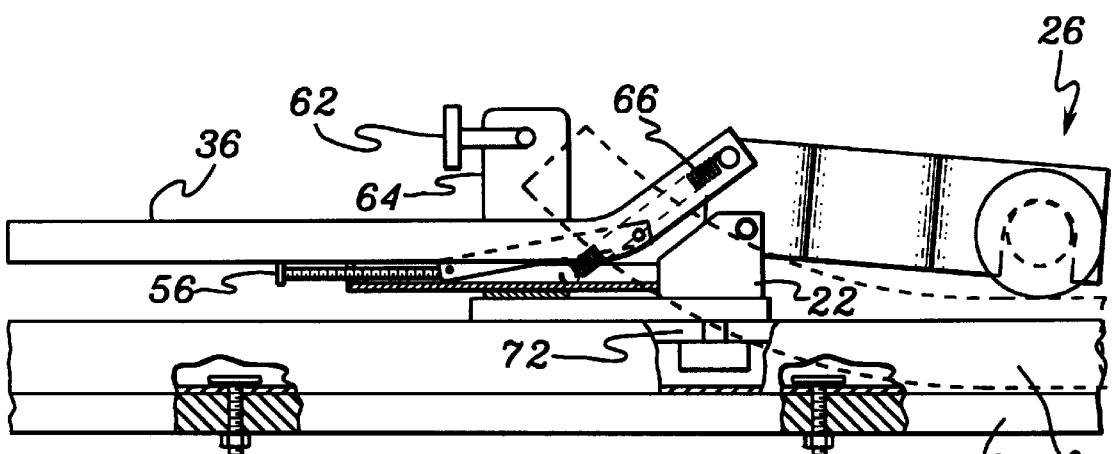
FIG. 4 is a view of the system shown in FIG. 2, with the end effector being in the clamped position.
Figure 5:
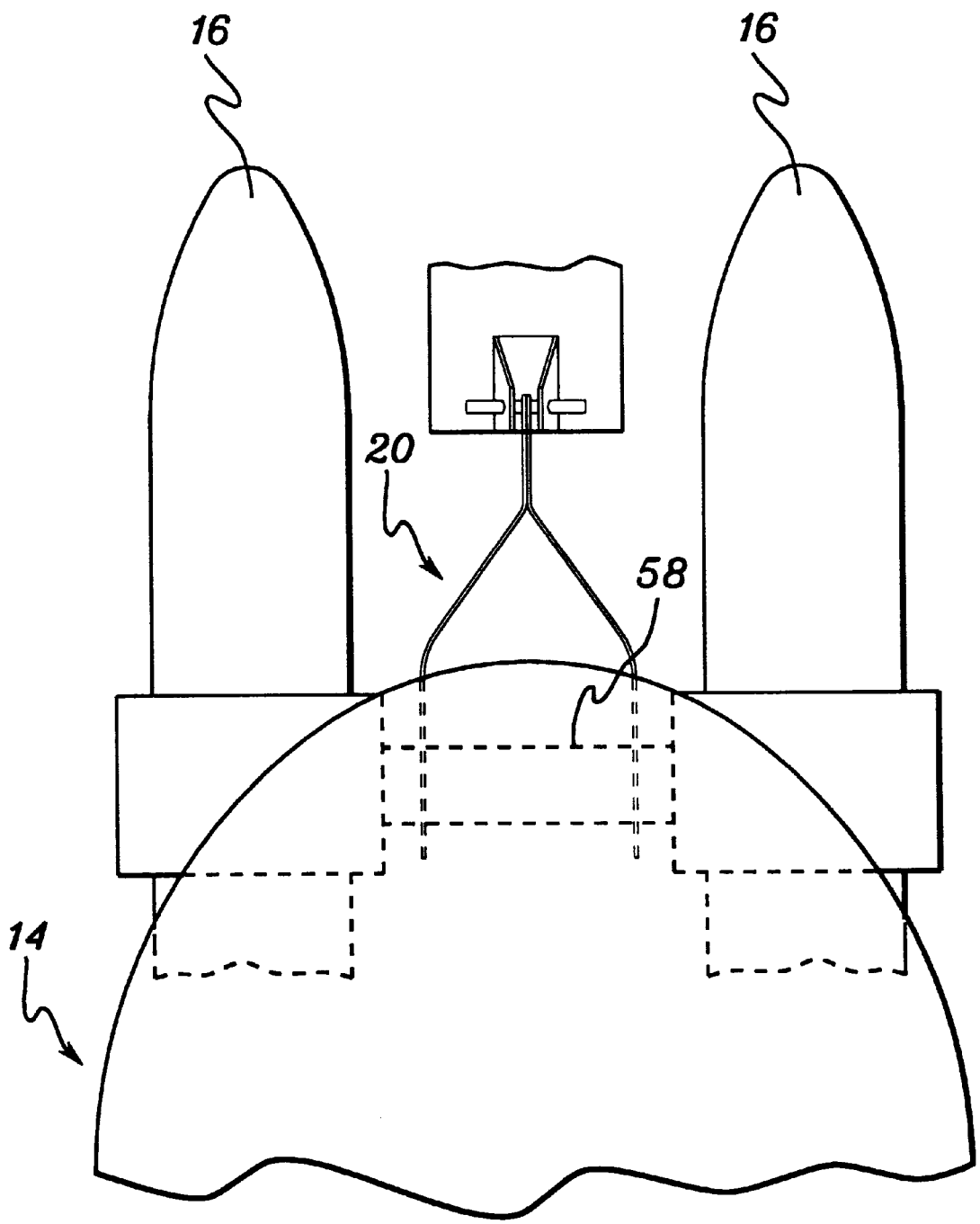
FIG. 5 is a top plan view of a portion of our system demonstrating the location of the system relative to a snowmobile when the snowmobile is secured on a trailer surface.

Another feature of the invention comprises locking the end effector 20 in the clamped position 26. One way to do this is by a self-locking configuration wherein the transfer linkage and the lever are configured in an angular relationship relative to one another. More specifically, excellent results are obtained when the lever has a curved end portion 38 and the angle defined between the transfer member 48 and the curved end portion 38 is an angle 54 of at least at least 180°. That is, starting at FIG. 2 and going to FIGS. 3 and 4, as the lever is actuated in a direction toward the support surface the end effector and the transfer linkage also move in the same direction (with the distant end 37 of the lever and the distant end 32 of the end effector moving away from each other) and the angle 54 defined between the transfer member and the lever approaches and exceeds 180°. Once the angle 54 exceeds 180°, by even a little bit, a jam is created by the lever and linkage wherein the end effector is locked in the clamped position. Any upward force by or upon the end effector, independent of the lever 36, serves only to further force the transfer member and lever downward into engagement with the transfer channel thereby jamming or locking the end effector in the clamped position.

When in the clamped position, another locking feature of the invention comprises a locking member 62 engageable with a locking bracket 64. The locking bracket is preferably rigidly connected to the base plate by any appropriate means. In operation, the locking member, such as a pad-type lock, overlies the lever and engages locking holes 65 of the locking bracket to restrict manipulation of the end effector, namely, from out of the clamped position.

To unclamp the end effector, the lever is raised away from the base plate. In this way the jam angle is relaxed and brought to less than 180°. It is preferred that a tensioner 66, such as a pair of springs or other resilient members, be attached or joined between the support surface and the lever to assist the lever in manipulating the end effector, namely, in an upward direction away from the base plate when unclamping the force transmitting member 58.

The clamping device 10 is preferably removably connectable to the support surface. To this end, the clamping device includes a connecting mechanism 68 attached to the base plate. The mechanism 68 may comprise at least one connecting member 69 such as a nut and bolt combination. In such a case, the bolt can be directly engaged with a threaded hole existing in the support surface or it can be sized for engagement through the hole and connection with a nut on the other side for removably connecting the clamping device to the support surface.

Alternately, a support surface channel 70, may exist already attached, or can be provided to be securable to the support surface, such as by T-shaped anchors 76 in a manner similar to the connecting member 69 above. The channel 70 preferably includes curved inwardly upper edges 72. In such a case, the connecting mechanism will comprise a T-shaped bolt 74. In operation, the T-shaped bolt is inserted into the support surface channel and turned, preferably 90°, to engage the support surface channel wherein the clamping device is connectable to the support surface by the T-shaped bolt being retained in the channel 70.

It is preferred to employ the T-shaped bolt and channel 70 to locate the clamping device adjacent to the support surface. Further, the T-shaped bolt should be sized so that it slidably engages the surface channel when inserted therein. Together, the clamping device can be loosely retained by the support surface channel but yet selectively positionable in the channel, becoming fixed therein when the end effector is moved into the clamped position. In this way, the positionability of the clamping device relative to the support surface can be maximized.

Generally, the invention as a whole is preferably constructed of metal, except for the cushions 60. As shown, the invention utilizes a configuration securable to the support surface at a position substantially out from underneath the recreational vehicle or appliance. In this way, actuating the lever avoids interference with the recreational vehicle and allows the user maximum leverage to provide an adequate downward force for securing the vehicle or appliance to the support surface. Further, it should be understood that the end effector is positionable in a continuous range from the unclamped position 28 to the clamped position 26. This positionability better enables multiple adjustments for: the clamping device relative to the support surface; the clamping device relative to the recreational vehicle or appliance; the recreational vehicle relative to the support surface; as well as, adjustments for different type, size and configured recreational vehicles or appliances.

As various possible embodiments may be made in the above invention for use for different purposes, and as various changes might be made in the embodiments herein set forth, it is understood that all of the above matters set forth here or shown in the accompanying drawings are to be interpreted as illustrative and not in a limiting sense.

We claim:

1. A clamping system for securing a recreational vehicle to a support surface comprising:
    a bar adapted to engage the recreational vehicle;
    a clamping device operatively engageable with the bar to secure the recreational vehicle to the support surface;
    the clamping device comprising
        a base plate mountable on the support surface,
        an end effector attached to the base plate and actuatable between a clamped and an unclamped position to clamp and unclamp the bar,
        a lever operatively connected to the end effector and movable relative thereto; and
        a transfer linkage operatively connected to the lever and movable relative thereto, wherein the lever and the transfer linkage cooperate to actuate the end effector to clamp and unclamp the bar; and,
    a connecting mechanism coupled to the base plate wherein the clamping device is removably connectable to the support surface.

2. The clamping system of claim 1, wherein the clamping device is connectable to the support surface at a position substantially out from underneath the recreational vehicle wherein actuating the lever avoids interference with the recreational vehicle.

3. The clamping system of claim 1, wherein the end effector comprises a Y-shaped member bifurcated at a distant end.

4. The clamping system of claim 1, further comprising means for locking the end effector in the clamped position.

5. The clamping system of claim 4, wherein the means for locking comprises a locking member engageable with a locking bracket, the locking bracket being connected to the base plate and wherein engaging the locking member and the locking bracket restricts manipulation of the end effector.

6. The clamping system of claim 4, wherein the means for locking comprises a transfer mechanism which includes the lever and transfer linkage operatively coupled to the lever and wherein the transfer linkage and the lever are coupled in an angular relationship relative to one another.

7. The clamping system of claim 6, wherein the means for locking further comprises the transfer linkage including a transfer member and a transfer channel, the transfer member is joined to the lever and is engageable with the transfer channel and wherein the angular relationship between the lever and the transfer linkage comprises an angle of at least 180° defined between the transfer member and the lever.

8. The clamping system of claim 6, wherein the means for locking further comprises a locking member engageable with a locking bracket, the locking bracket being connected to the base plate and wherein engaging the locking member and the locking bracket restricts manipulation of the end effector.

9. The clamping system of claim 6, wherein the lever and the end effector rotate with each other in the same upward and downward directions when the transfer mechanism operates with the end effector.

10. The clamping system of claim 1, further comprising means for incrementally adjusting the clamped position of the end effector.

11. The clamping system of claim 1, further comprising a tensioner attached to the base plate and the end effector.

12. The clamping system of claim 1, wherein the connecting mechanism further comprises means for removably connecting the clamping device to the support surface.

13. The clamping system of claim 1, further comprising a support surface channel securable to the support surface and wherein the connecting mechanism can be removably connected to the support surface channel for connecting the clamping device to the support surface.

14. The clamping system of claim 13, wherein the connecting mechanism comprises a T-shaped bolt, the support surface channel has curved upper edges and the T-shaped bolt is inserted into the support surface channel and turned to engage the support surface channel whereby the clamping device is connectable to the support surface.

* * * * *